Patented Feb. 5, 1946

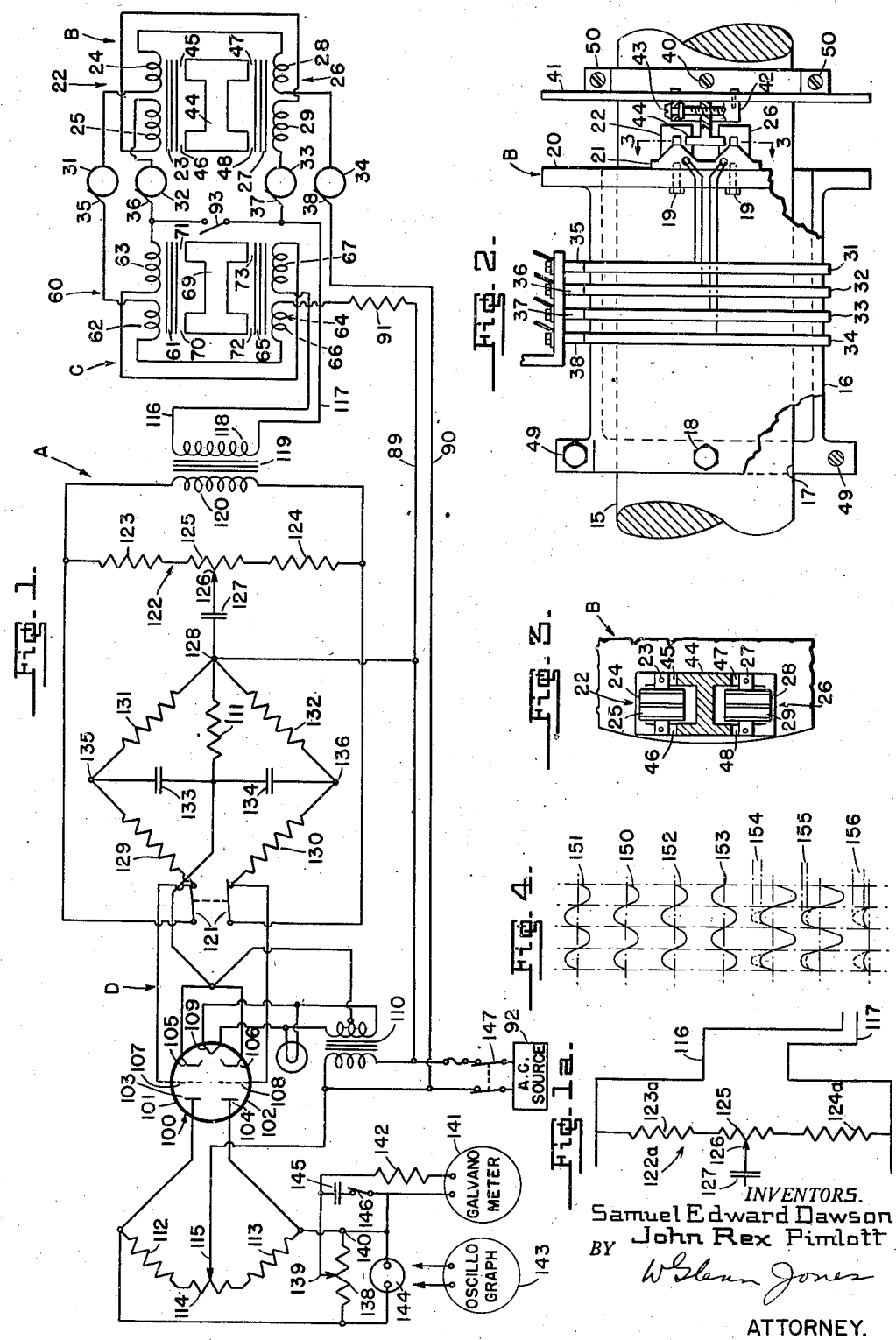

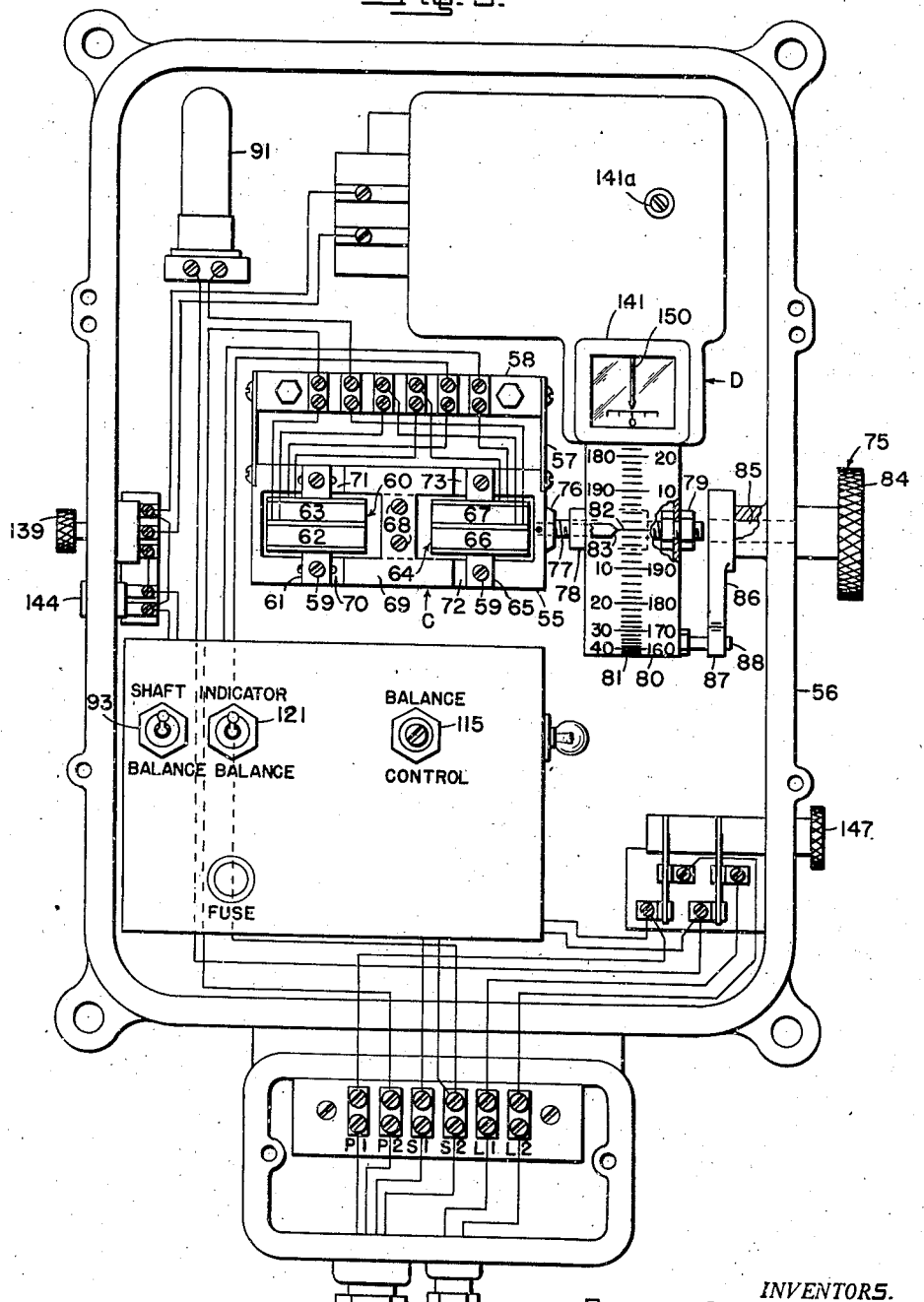

2,393,977

UNITED STATES PATENT OFFICE 2,393,977

ELECTRONIC NULL INDICATOR FOR ELECTROMAGNETIC MICROMETERS

Samuel Edward Dawson, Fairway Hills, Md., and John Rex Pimlott, Lubbock, Tex.

Application May 25, 1944, Serial No. 537,306

3 Claims. (Cl. 177—351)

(Granted under the act of March 3, 1883, as amended April 30, 1928; 370 O. G. 757)

The invention relates to improvements in measuring apparatus particularly adapted but not necessarily limited to use in measuring shaft torque during transmission of power.

An important object of the invention is the provision of a simple, compact electronic null indicator for manually balanced, alternating current electromagnetic torsionmeters of the type disclosed in British Patent No. 215,986 granted to Ford.

Another object of the invention is to provide an indicator of the character described having means for indicating slowly or rapidly varying transient torque by the use of a suitable oscillograph.

A further object is the provision of a null indicating device which is adjustable to insure that any indications on either side of the null or zero position will be accurately proportional to the changes in torque being measured.

The invention also aims to provide a torsionmeter of the character described having means facilitating the accurate adjustment of its parts to compensate for various irregularities in the electrical characteristics thereof, thus making permissible the slight irregularities in power factor usually found in commercially wound coils used in electromagnetic bridges and correcting for changes in transconductance and transconductance ratios in commercially manufactured electron discharge devices.

The invention further aims to provide a null indicator for a torsionmeter of the character described which will indicate the sense as well as the degree of unbalance with respect to the zero or null reference position.

Yet another object is the provision of a meter including differentially connected electromagnetic transmitter and receiver assemblies which may be separately balanced without regard to the balance of the assemblies as a whole. As applied to torsionmeters, this permits setting the transmitter assembly so that its balanced or zero output position may correspond to any desired condition of shaft torque.

Other objects and advantages of the invention will become apparent during the course of the following detailed description, taken in connection with the accompanying drawings, forming a part of this specification, and in which drawings:

Figure 1 is a diagrammatic view of the torsionmeter parts and electrical connections therefor.

Figure 1a is a fragmentary diagrammatic view of a modified portion of the torsionmeter.

Figure 2 is a fragmentary side elevational view of the electromagnetic transmitter assembly applied to a shaft.

Figure 3 is a fragmentary cross sectional detail view taken substantially on the line 3—3 of Figure 2.

Figure 4 is a diagrammatic view showing the phase relationship of voltages present in various portions of the torsionmeter for one condition of unbalance.

Figure 5 is a front elevational view of the Ford torsionmeter box containing the improved null indicator.

In the drawings, which show preferred and modified forms of the invention, and wherein similar reference characters denote corresponding parts throughout the several views, the letter A generally designates the torsionmeter, B the transmitter assembly, C the receiver assembly, and D the electronic null indicator.

Referring first to the transmitter assembly B, shown in Figures 1, 2 and 3, there is disposed in outwardly spaced coaxial relation to the drive shaft 15, a sleeve or husk 16 provided at one end with an internal flange 17 disposed in encircling engagement with the driveshaft, as shown in Figure 2. This flange 17 is fastened to the driveshaft, as by setscrew 18. Rigidly secured, as by screws 19, to an out-turned flange 20 at the opposite end of the husk 16 is a bracket 21 carrying spaced electromagnetic transformers. One of these transformers 22 includes a core 23 carrying primary and secondary windings 24, 25. The other transformer 26 is similar and includes a core 27, and primary and secondary windings 28, 29. As shown in Figure 1, the primary windings 24, 28 are series additively connected and the secondary windings 25, 29 are series differentially connected so that the transformers 22, 26 work in opposition. Suitable slip rings 31—34 cooperate with brushes 35—38 in the usual manner to maintain electrical connections between moving and stationary parts.

Fastened on the drive shaft, as by setscrew 40, is an annular plate 41 provided with a bracket 42 carrying a screw 43 in threaded engagement with an H-shaped armature 44. This armature 44 is disposed between the transformers 22, 26 and cooperates with the cores 23, 27 to form magnetic circuits interrupted by gaps 45—48. By turning the screw 43, the relative lengths of the gaps 45, 46 and the gaps 47, 48 may be varied. The plate 41 and husk 16 may each be formed in halves separately secured together as by screws 49, 50 respectively, so as to facilitate the assembly and dismantling of parts on the shaft 15.

Referring now more particularly to Figure 5, the receiver assembly C shown therein includes a rectangular frame 55 supported for movement transversely of the meter box 56, as by leaf springs 57, and bracket 58. Fastened in adjustably spaced relation on the frame 55, as by screws 59, are electromagnetic transformers. One of these transformers 60 includes a core 61 carrying primary and secondary windings 62, 63, the companion transformer 64 likewise including a core 65 and primary and secondary windings 66, 67. Fixed to the meter box 56 between the transformers 60, 64, as by screws 68, is an H-shaped armature 69 cooperating with the transformer cores 61, 65 to form magnetic circuits interrupted by gaps 70—73.

Means 75 is provided for manually adjusting the frame 55 relative to the armature 69 and for indicating the magnitude and sense of displacement of the armature 69 relative to the transformers 60, 64 carried by the frame. Swivelled at 76 to the frame 55 is a shaft 77 extending through and in screw-threaded engagement with a stationary bracket 78. Releasably secured against rotation on the shaft 77, as by lock-nut 79, is a drum 80 provided with suitable circumferentially extending indicia 81 originating at a central zero mark 82. Fixed on the frame 55 is an index pointer 83 cooperating with the indicia 81 to indicate the magnitude and sense of any lateral displacement of the transformers 60, 64 relative to the armature 69 by the magnitude and direction of angular displacement of the drum 80. Secured to a knob 84 is a rotary shaft 85 extending into the meter box and provided with an arm 86 having a forked end 87 in motion transmitting engagement with a pin 88 on the drum.

Turning now to Figure 1, it will be seen that the series additively connected primary windings 62, 66 of the receiver assembly C and the series additively connected primary windings 24, 28 of the transmitter assembly B are connected through conductors 89, 90 and a resistor 91 to a source 92 of alternating current of any desired frequency. Since 110 volts, 60 cycle supply is generally the most readily available and is also sufficiently high in frequency to measure most superimposed transient torques, it should be used in all but the most extraordinary cases. The present invention does not require the use of voltage regulators, oscillators or electronic apparatus, other than a twin triode tube to be subsequently described, when it is not necessary that the unbalance of the electromagnetic transformer systems be used to determine torque changes quantitatively. In the majority of torsionmeter applications, the average torque is all that is desired and the transformer systems will be balanced manually, as by the means 75.

The secondary windings 25, 29 of the transmitter assembly B and the secondary windings 63, 67 of the receiver assembly C are differentially serially connected so that the voltages therein will depend on the relative lengths of the transmitter gaps 46—48 and the receiver gaps 70—73. Thus the differential output or resultant voltage of the secondaries of transformers 22, 26, 60, 64 may be used as a measure of the difference in displacement of the armatures 44, 69 from their neutral or reference positions. In order to eliminate any effect of the transmitter assembly B on the output of the receiver assembly C whenever the neutral position of the receiver armature with respect to the receiver transformers is to be determined, a switch 93 is provided for establishing a short circuiting connection across the transmitter secondary windings 25, 29.

The electronic null indicator D includes a twin tube 100 embodying a pair of electron discharge devices 101, 102, comprising anodes 103, 104, cathodes 105, 106 and control electrodes 107, 108. The cathodes 105, 106 may be heated as by a filament 109 energized by current from the source 92 through a transformer 110. Alternating current from the source 92 is supplied to the electron discharge devices 101, 102 through a common cathode bias resistor 111 and parallel anode resistors 112, 113. Connected between the anode resistors 112, 113 is a balancing resistor 114 provided with a movable tap 115 for adjustably dividing the anode current to compensate for inequalities in resistors 112, 113 and for variations in steady state amplification.

Means is provided for impressing, on the control electrodes 107, 108, alternating signal voltages of opposite polarity and of a magnitude and phase depending on the magnitude and phase of the combined output of the secondaries of the transmitter and receiver transformers 22, 26, 60, 66. The transformer secondary windings 25, 29, 63, 67 are connected, as by conductors 116, 117 to the primary winding 118 of a coupling transformer 119, having the extremities of its secondary winding 120 connected, as by a double pole switch 121, respectively to the control electrodes 107, 108. Connected across the extremities of the secondary winding 120 is a voltage divider 122 comprising low impedance resistors 123, 124 and an intermediate balancing resistor 125 having an adjustable tap 126. This resistor 125 constitutes means for dividing the signal voltages between the control electrodes 107, 108 so that, without regard to lack of symmetry in the transmitter and receiver assemblies B, C, or to inequality of transconductance of the electron discharge devices 101, 102, the galvanometer to be hereinafter mentioned, can be made to swing equal distances either side of its zero center for equal movements of either armature 44, 69 from the balanced position.

The tap 126 is connected, through a condenser 127 and the cathode bias resistor 111, to the cathodes 105, 106. Serially connected between the control electrodes 107, 108 and a point 128 which is intermediate the resistor 111 and condenser 127, are grid leak resistors 129, 130 and grid filter resistors 131, 132 respectively. Suitable grid filter condensers 133, 134 are disposed between the cathodes 105, 106 and points 135, 136 intermediate the filter and leak resistors, respectively.

Connected across the anode resistors 112, 113, 114 is a sensitivity control resistor 138 provided with an adjustable tap 139. Serially connected between one extremity 140 of the resistor and the tap 139 are a center zero galvanometer 141 and a resistor 142.

When it is desired to measure transient or oscillating torque, a cathode ray oscillograph 143 may be connected across the resistor 138 at socket 144. During use of the oscillograph 143, it is preferred to limit current flow resulting from unbalanced signal voltages. Because of the high input impedance of the electron tube 100, it is only necessary to eliminate the coupling transformer 119 and connect the transmitter and receiver output conductors 116, 117 directly to the control electrodes 107, 108 to prevent appreciable current flow for maximum unbalance and hence to eliminate the principal cause of errors due to the use of non-null methods of making electrical measurements through slip rings and over transmission lines of variable length. In connecting the conductors 116, 117 directly to the control electrodes 107, 108, the coupling transformer 119 shown in Figure 1 is omitted, as indicated in Figure 1a, and a voltage divider 122a is employed having resistors 123a, 124a of higher impedance than the corresponding resistors 123, 124 of Figure 1. If it is desired to measure small superimposed transient or oscillating torques while the instrument is used as a null indicator for average torque measurements, the arrangement shown in Figure 1 will be used, except that the galvanometer filter condenser 145 will be disconnected as by opening a switch 146. The adjustable contact 139 of the resistor 138 should be left in position for zero sensitivity when the oscillograph 143 is in use unless it is desired to reduce the amplitude of the transient signal.

The procedure for balancing the torsionmeter before use will now be described. First the system is energized for a warming-up period, as by closing a suitable switch 147 and the sensitivity control tap 139 is moved to its position of full sensitivity. With the switch 121 open, the balance control resistor 114 is adjusted at the tap 115 until the galvanometer 141 reads zero. This adjustment compensates for inequalities in the anode resistors 112, 113 and for variations in steady state amplification such as produced by inequalities in resistors 129, 130 or in the characteristics of the twin tube 100. If adjustment of the sensitivity control 139 results in movement of the galvanometer pointer 150, the galvanometer zero adjustment 141a should be corrected until the pointer will indicate zero with the sensitivity control in any position. Then the switches 121 and 93 are closed and the knob 84, shown in Figure 5, is turned until the galvanometer reads zero. The drum 80 should now be released at the lock-nut 79 and set so that the index 83 will correspond to drum scale zero. This adjustment correlates the zero setting of the drum scale with the neutral position of the armature 69. Next the equalizing balance control tap 126 is adjusted until the galvanometer pointer swings equidistantly each side of its zero position upon rotation of the drum equiangularly each side of drum scale zero. With the switch 93 open, the relationship of the transmitter armature 44 and transformers 22, 26 is adjusted at screw 43 until the galvanometer again reads zero with the drum scale at zero. When the system has been correctly balanced, the galvanometer will not deflect upon closing and opening the switch 93. By rotating the transmitter armature adjustment screw 43 one turn each side of its neutral position and observing drum readings when the galvanometer is at zero, the receiver transformer gaps 70—73 may be adjusted in length so as to obtain the desired ratio of movement between the screw 43 and the drum shaft 77.

The operation of the torsionmeter will now be discussed in connection with one condition of unbalance in the transmitter assembly B produced by displacement of the armature 44 from its neutral position in a direction depending on the direction of rotation of the shaft. Obviously, the armature 69 must be moved in the correct direction to cause the unbalance in the receiver assembly secondary coils 63, 67 to be equal and opposite to the unbalance created by displacement of the armature 44 of the transmitter assembly. Since the transformer windings are connected in opposition, any displacement of the transmitter armature 44 in one direction from its position of balance will cause a signal voltage to appear in the secondary output conductors 116, 117 which will be 180 degrees out of phase with the signal voltage which would have appeared had the armature 44 been displaced in the opposite direction. Referring to Figure 4, the signal voltage 150 applied to the primary winding 118 of the coupling transformer 119 for the condition of unbalance selected for description is in phase with the reference voltage 151 supplied to the primary windings 24, 28, 62, 66 by the alternating current source 92. The signal voltage 152 impressed on the control electrode 107 originates in the secondary winding 120 of the coupling transformer and is assumed to be in phase with the reference voltage 151 for the selected condition of unbalance. Thus the signal voltage 153 impressed on the control electrode 108 is 180 degrees out of phase with the reference voltage 151. The resulting increase in current flow through the space discharge device 101 and decrease in current flow through the space discharge device 102 gives rise to a decreased voltage level 154 at the anode 103 and an increased voltage level 155 at the anode 104. The voltage difference 156 between these voltage levels 154, 155 is impressed on the sensitivity control resistor 140 so that the resistance drop through the section thereof included in the galvanometer circuit will deflect the galvanometer in a direction and magnitude depending on the direction and magnitude of the condition of unbalance. If now the armature 69 is moved, as by rotation of knob 84, in such a direction as to cause the galvanometer needle to return to zero and this motion is continued beyond the balance point, the galvanometer needle will swing in the opposite direction. It will thus be seen that we have provided an improved measuring apparatus fulfilling the requirements of simplicity, directionality, accuracy and ease of installation and adjustment.

Various changes may be made in the forms of invention herein shown and described without departing from the spirit of the invention or the scope of the following claims.

The invention described herein may be manufactured and used by or for the Government of the United States of America for governmental purposes without the payment of any royalties thereon or therefor.

We claim:

1. In measuring apparatus of the class described, a source of alternating current; a transmitter assembly; a receiver assembly; said assemblies each including electro-magnetic transformers energized by said alternating current source and working in opposition, an armature having a neutral position relative to said transformers, the outputs of said transformers being balanced upon disposition of said armature in said neutral position, said armature being displaceable in either of two opposed senses from said neutral position to disturb the balance of said transformer outputs whereby a differential output is produced, the magnitude of which varies with the displacement and the phase of which is opposite upon displacement of the armature in one sense from said neutral position to the phase upon displacement of the armature in the other sense; means displacing the transmitter armature from its neutral position in an amount and sense depending on the magnitude and sense of a force or condition to be measured; means indicating the amount and sense of displacement, if any, of the receiver armature from its neutral position; two electron discharge devices each including an anode, a cathode and a control electrode; means including a coupling transformer energized by the differential output of said transmitter and receiver assemblies for impressing equal signal voltages of opposite polarity on the control electrodes of said discharge devices when said assemblies are unbalanced, the magnitude and phase of said voltages depending on the amount and sense of unbalance of said assemblies; anode-cathode circuits for said discharge devices including relatively adjustable resistors; means for supplying said circuits with alternating current in synchronism with the alternating current from said source; and means indicating the magnitude and direction of any difference in current flow through said circuits including a center-zero galvanometer serially connected with said resistors; said signal voltage impressing means including a switch for disconnecting said coupling transformer from said control electrodes whereby said galvanometer may be balanced with respect to said discharge devices uninfluenced by said signal voltages by adjustment of said resistors with said switch in its open position.

2. In measuring apparatus of the class described, a source of alternating current; a transmitter assembly; a receiver assembly; said assemblies each including electromagnetic transformers energized by said alternating current source and working in opposition, an armature having a neutral position relative to said transformers, the outputs of said transformers being balanced upon disposition of said armature in said neutral position, said armature being displaceable in either of two opposed senses from said neutral position to disturb the balance of said transformer outputs whereby a differential output is produced, the magnitude of which varies with the displacement and the phase of which is opposite upon displacement of the armature in one sense from said neutral position to the phase upon displacement of the armature in the other sense; means displacing the transmitter armature from its neutral position in an amount and sense depending on the magnitude and sense of a force or condition to be measured; means indicating the amount and sense of displacement, if any, of the receiver armature from its neutral position; two electron discharge devices each including an anode, a cathode and a control electrode; means energized by the differential output of said transmitter and receiver assemblies for impressing equal signal voltages of opposite polarity on the control electrodes of said discharge devices when said assemblies are unbalanced, the magnitude and phase of said voltages depending on the amount and sense of unbalance of said assemblies; anode-cathode circuits for for said discharge devices; means for supplying said circuits with alternating current in synchronism with the alternating current from said source; means indicating the magnitude and direction of any difference in current flow through said circuits; and a switch operable to eliminate any effect of said transmitter output on said signal voltages so that the neutral position of the receiver armature with respect to the receiver transformers may be indicated by said last-mentioned indicating means.

3. In measuring apparatus of the class described, a source of alternating current; a transmitter assembly; a receiver assembly; said assemblies each including electro-magnetic transformers energized by said alternating current source and working in opposition, an armature having a neutral position relative to said transformers, the outputs of said transformers being balanced upon disposition of said armature in said neutral position, said armature being displaceable in either of two opposed senses from said neutral position to disturb the balance of said transformer outputs whereby a differential output is produced, the magnitude of which varies with the displacement and the phase of which is opposite upon displacement of the armature in one sense from said neutral position to the phase upon displacement of the armature in the other sense; means displacing the transmitter armature from its neutral position in an amount and sense depending on the magnitude and sense of a force or condition to be measured; means indicating the amount and sense of displacement, if any, of the receiver armature from its neutral position; two electron discharge devices each including an anode, a cathode and a control electrode; means for impressing equal signal voltages of opposite polarity on the control electrodes of said discharge devices when said assemblies are unbalanced, the magnitude and phase of said voltages depending on the amount and sense of unbalance of said assemblies, said voltage impressing means including a coupling transformer normally energized by the differential output of said transmitter and receiver assemblies, a resistor connected between said control electrodes and across the output of said coupling transformer, and means connecting the cathodes of said discharge devices to any one of a plurality of points along the resistor for adjustably dividing the signal voltages impressed on the control electrodes to balance the outputs of said discharge devices; anode-cathode circuits for said discharge devices; means for supplying said circuits with alternating current in synchronism with the alternating current from said source; means indicating the magnitude and direction of any difference in current flow through said circuits; and a switch operable to eliminate any effect of said transmitter output on said signal voltages so that the neutral position of the receiver armature with respect to the receiver transformers may be indicated by said last-mentioned indicating means.

SAMUEL EDWARD DAWSON.
JOHN REX PIMLOTT.